United States Patent [19]

Shyu et al.

[11] Patent Number: 4,739,035
[45] Date of Patent: Apr. 19, 1988

[54] TWO-STEP PROCESS FOR THE MANUFACTURE OF POLYAMIDE FROM DIAMINE AND DINITRILE

[75] Inventors: Wen B. Shyu, Chagrin Falls; Gerald P. Coffey, Lyndhurst, both of Ohio

[73] Assignee: The Standard Oil Company, Cleveland, Ohio

[21] Appl. No.: 900,970

[22] Filed: Aug. 27, 1986

[51] Int. Cl.$^4$ ............................................. C08G 69/28
[52] U.S. Cl. ................................... 528/335; 528/336
[58] Field of Search ............................... 528/336, 335

[56] References Cited

U.S. PATENT DOCUMENTS

| | | | |
|---|---|---|---|
| 2,130,948 | 9/1938 | Carothers | 528/336 |
| 2,831,834 | 4/1958 | Magat | 528/336 |
| 2,918,455 | 12/1959 | Elod et al. | 528/336 |
| 2,923,699 | 2/1960 | Indest et al. | 528/336 |
| 3,407,179 | 5/1965 | Carr | 528/336 |
| 3,459,714 | 8/1969 | Wolfes et al. | 528/336 |
| 3,846,381 | 11/1974 | Kwok | 528/336 |
| 3,932,364 | 1/1976 | Yamazaki et al. | 528/336 |
| 4,380,623 | 4/1983 | Greene et al. | 528/336 |
| 4,490,521 | 12/1984 | Coffey et al. | 528/336 |
| 4,501,881 | 2/1985 | Greene et al. | 528/336 |

*Primary Examiner*—Harold D. Anderson
*Attorney, Agent, or Firm*—David P. Yusko; John E. Miller; Larry W. Evans

[57] ABSTRACT

The process for manufacturing polyamides, suitable for fibers, from an $\alpha,\omega$-dinitrile, and an $\alpha,\omega$-diamine in water in contact with a catalyst that is improved by (1) first, reacting the dinitrile and water in the presence of the catalyst at a temperature sufficient to cause substantial hydrolysis of the dinitrile and (2) subsequently adding the diamine to the reaction mixture of the dinitrile and water at a temperature sufficient to cause polymerization.

18 Claims, No Drawings

TWO-STEP PROCESS FOR THE MANUFACTURE OF POLYAMIDE FROM DIAMINE AND DINITRILE

BACKGROUND OF THE INVENTION

1. Field of the Invention

This invention relates to polyamides. More specifically, this invention relates to an improved process for manufacturing polyamides from an $\alpha,\omega$-dinitrile, and an $\alpha,\omega$-diamine in water in contact with a catalyst. The instant invention is a two-step polymerization process wherein the dinitrile and water react in the presence of a catalyst followed by the addition of and polymerization with the diamine. For example, the instant invention relates to an improved process for manufacturing nylon-6,6 from adiponitrile and hexamethylenediamine in water in contact with an oxygenated compound of phosphorus as a catalyst, utilizing this two-step polymerization process.

2. Description of the Prior Art

At the present the commercial route to nylon-6,6 is the polymerization of a dicarboxylic acid (i.e. adipic acid) and a diamine (i.e. hexamethylenediamine). Alternative routes to nylon-6,6, such as by the polymerization of a dinitrile and a diamine, have long been recognized. For example, U.S. Pat. No. 2,245,129, issued in 1938 to Greenwalt, describes a method for producing a linear polyamide by heating the reaction mixture of a dinitrile, a diamine and water. The Greenwalt procedure consists of two stages. In the first stage the reaction mixture is heated in a closed reaction vessel until a low molecular weight polyamide is formed; while in the second stage, this low molecular weight polyamide is converted to a high molecular weight polyamide upon additional heating.

Later, U.S. Pat. No. 3,847,876 to Onsager teaches another method for preparing a high molecular weight polyamide comprising contacting a dinitrile, a diamine and water. The Onsager process required at least equal molar amounts of diamine and dinitrile to be initially present in the reaction mixture and further requires that the polymerization occur in the presence of controlled amounts of ammonia, preferably in the presence of at least three weight percent based on the total weight of the diamine, dinitrile and water. This generally entails addition of ammonia to the reaction mixture over the course of the reaction.

More recently, Hoffmann et al., in U.S. Pat. No. 4,436,895, disclose an improved method for preparing a high molecular weight polyamide from a dinitrile, diamine and water by conducting the polymerization in the presence of one of (1) an oxygen-containing phosphorus compound, (2) an oxygen-containing boron compound (3) acidic oxygen-containing sulfur compounds and (4) hydrogen halide and ammonium or ammonium alkyl salts thereof. This process reduces the conventional reaction time of the polymerization and produces a high molecular weight, linear polyamide having desirable weight loss spinning properties.

Further, U.S. Pat. No. 4,520,190 to Coffey et al., describes the process for producing a polyamide by contacting a diamine, a dinitrile and water wherein the diamine is added gradually to the dinitrile over the course of polymerization in the presence of an oxygenated phosphorus compound catalyst.

A goal of these prior art processes was to produce nylon-6,6 suitable for fiber spinning, which could compete on a commercial basis with nylon-6,6 produced by the adipic acid/hexamethylenediamine route. While the prior art processes produce nylon-6,6, which can be made into nylon-6,6 fiber, the nylon-6,6 produced from dinitriles and diamines by these prior art processes is not ideal for fiber formation on a commercial scale. It has been discovered that the reason for this is the formation of impurities during the polymerization process. The impurities lower the crystallization rate of the polyamide and yield a polymer with poorer physical properties. The impurities also are subject to premature gelation, which accumulates and constricts manifold lines and fouls commercial spinning equipment after only a few hours of fiber production.

Specifically, the reaction of the dinitrile with a diamine in excess water to produce a polyamide can be shown as follows:

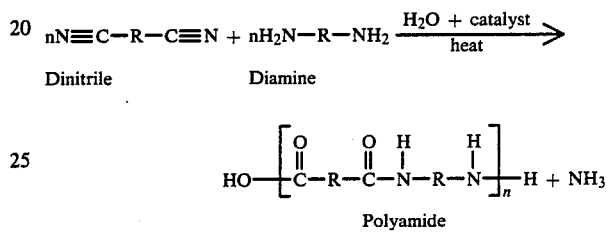

It has been discovered that during the above polymerization reaction the diamines will react to form bis-(hexamethylene)triamine as follows:

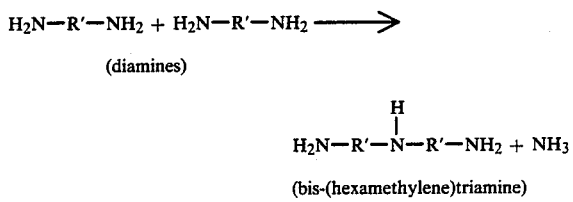

The —NH— in the middle of the bis-(hexamethylene)triamine (hereinafter referred to simply as "triamine") provides a third reactive site for the triamine to react and attach and eventually branch and crosslink with polymeric chains. In order to produce commercial fiber grade quality nylon, the reaction of the dinitrile and diamine must yield a linear polymer. The branching and crosslinking of the triamine destroys the linearity of the polymer. Consequently, a process which limits the formation of triamine is desirable.

The objective of the instant invention is a process for the polymerization of dinitriles and diamines which will limit the formation of these triamine and other impurities and which will produce nylon-6,6 suitable for commercial fiber-forming operations.

SUMMARY OF THE INVENTION

Polyamides, having levels of bis(hexamethylene)triamine less than 500 parts per million by weight, are produced from $\alpha,\omega$-dinitriles, $\alpha,\omega$-diamines and water in contact with a catalyst. Polyamides with such low levels of triamine impurities are suitable for commercial fiber forming applications.

The process for manufacturing polyamides suitable for fiber forming from an $\alpha,\omega$-dinitrile and an $\alpha,\omega$-diamine in water in contact with a catalyst is improved by (1) first, reacting the dinitrile and water in the presence of the catalyst at a temperature sufficient to cause substantial hydrolysis of the dinitrile, prior to substantial addition of the diamine and (2) subsequently adding the diamine to the reaction mixture of the dinitrile and water at a temperature sufficient to cause polymerization.

DETAILED DESCRIPTION OF THE INVENTION

The Two-Step Process

The hallmark of the instant invention is a two-step process for the polymerization of dinitriles and diamines in water in contact with a catalyst. The result of this process is that polyamides with substantially reduced levels of bis-(hexamethylene)triamine impurities are produced.

The first step is the "hydrolysis step" and comprises the substantial hydrolysis of the dinitrile in water at a temperature sufficient to cause substantial hydrolysis of the dinitriles. The second step is the "polymerization step" and comprises adding the diamine to the precursors formed in the first step at a temperature sufficient to cause polymerization.

"Hydrolysis" is a reaction in which water reacts with another substance to form two or more substances. Specifically, the hydrolysis of the dinitrile with water produce several "precursors" for the reaction with the diamine:

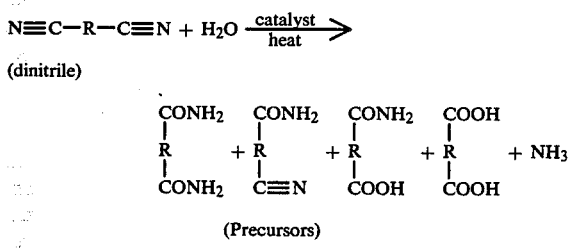

(Precursors)

If small quantities of the diamine ($H_2N-R-NH_2$) are present with the dinitrile and water an additional precursor,

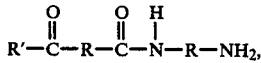

where R' is $-NH_2$ or $-OH$, is also formed.

Applicants have discovered that by first hydrolyzing the dinitrile, the precursors formed will readily and quickly react with the diamine during the polymerization step. Further, the formation of the triamine and other impurities is greatly reduced as a result of the substantial absence of the diamine during the hydrolysis step. The reduced triamine levels are responsible for a linear polyamide, suitable for fiber spinning being produced in the polymerization step.

The first step requires that substantially all the dinitrile react with water to form the precursors. Overall conversion of the dinitrile should be above 80 percent, more preferably about 90 percent and most preferably above 98 percent. Factors affecting the overall conversion are the interrelated parameters of temperature, pressure and time, as well as the catalyst used.

The temperature in the "hydrolysis step" must be sufficient to drive the hydrolysis of the dinitrile but not be so great as to cause the decomposition of the precursors formed (e.g. $HOOC-R-CONH_2$ will decompose to yield in part $CO_2$ and $NH_3$). The temperature employed in the "hydrolysis step" is typically lower than that needed to polymerize the second step. Typically, the temperature in the first step is maintained between about 200° C. to about 250° C., preferably between about 225° C. and about 245° C. and more preferably between about 235° C. and about 240° C.

The hydrolysis step is run under autogeneous pressure which will rise to about 200 to 1000 psia. Typically, the pressure will rise to about 350 to 550 psia.

The time required for substantial conversion of the dinitrile by hydrolysis varies with temperature and pressure, but typically will be in the range of 1 to 6 hours.

In the polymerization step the diamine is added to the reaction mixture of the dinitrile and water at a temperature sufficient to cause polymerization. The diamine may be added in a single charge or added gradually over a period of time. Typically, the diamine is pumped into the reactor, where the rate of diamine addition is determined by the capacity and speed of the pump. Preferably, the diamine is added gradually, such that the diamine is added over a period of time lasting between 20 minutes and 4 hours.

During the polymerization step, temperatures which will polymerize the reactants are required. In order to maximize the molecular weight of the polyamide being formed, it is preferred to conduct the polymerization at a temperature just below the lowest temperature at which either the catalyst, the monomers or the polyamide product begin to degrade. Typically, the polymerization step is in the range of about 250° C. to 300° C. Preferably, this temperature is in the range of about 255° C. to 275° C.

Typically, the polymerization step is initially conducted at autogenous pressure with a later reduction to atmospheric or subatmospheric pressure, the polymerization step can be conducted at constant pressure by applying an inert gas pressure to the system and adjusting this pressure as the reaction proceeds. The pressure can be maintained with a gaseous reactant or a gas inert to the reaction or some combination of the two. However, since the reaction itself is conducted in the liquid phase, the presence of a gaseous reactant is for the purpose of maintaining reaction pressure, not for participating in the polymerization.

In the instant process, water is necessary as both a reactant and as an aid in formation of the polyamide. Consequently, a stoichiometric excess of water is employed in the reaction mixture during the hydrolysis step and the excess water remains in the reaction during the polymerization step. The amount of water employed will also vary with the geometry of the reactor vessel. Preferably the initial water content of the reaction mixture does not exceed about 40 weight percent of the total weight of the reaction mixture (based on total reactants in both the hydrolysis and polymerization steps), more preferably it does not exceed 35 weight percent. Although it is not desired, more water can be used. However, since the water will have to be removed from the reaction product at the end of the polymerization, preferably the amount of excess water is kept to a minimum (21 weight percent or less) to facilitate ultimate removal. Moreover, the less water present during the polymerization generally means the less energy needed for the process and consequently, less expensive process equipment can be employed.

Ammonia is a by-product of both the hydrolysis step and polymerization step. As a consequence, ammonia is constantly being generated within the reaction mixture but it typically enters the vapor phase and is preferably continuously removed from the reaction zone (e.g. released through a pressure relief valve on the reaction vessel). The concentration of ammonia in the reaction mixture (which is a liquid) can vary from threshold detection limits up to about 5 weight percent of the total weight of the reaction mixture. Preferably, the concentration of ammonia in the liquid reaction mixture does not exceed 1 weight percent and more preferably is kept as low as possible.

The instant process requires the substantial hydrolysis of the dinitrile in water prior to substantial addition of the diamine. This means that up to approximately 10 percent by weight of the diamine may be present during the hydrolysis step without substantially affecting the triamine levels in the resulting polymer.

In one embodiment of this invention, nylon-6,6 of commercial fiber forming quality is prepared from adiponitrile, hexamethylene diamine and water. Adiponitrile, water (32 weight percent of mixture) and a phosphorous acid catalyst are charged to a batch reactor and heated to 240° C. After approximately 1¼ hours the diamine is added to the reactor. The temperature of the reactor is then raised to 260° C. The polymerization proceeds at 260° C. for approximately 1½ hours. The resulting polyamide exhibits triamine levels under 500 parts per million.

Monomers:

The $\alpha,\omega$-diamines used herein are of the formula $$R'HN-R-NHR' \quad (I)$$

where R is a divalent organic radical and each R' is independently hydrogen or a univalent organic radical. R can be a divalent aliphatic, alicyclic or aromatic radical and these radicals can bear one or more inert substituents. Similarly, each R' can be independently a hydrogen or a univalent aliphatic, alicyclic or aromatic radical and each one of these radicals can also bear one or more inert substituents. By the term "inert" is meant that the substituent is essentially nonreactive with the reactants, catalysts and products of the process under process conditions. Typically, R is a divalent $C_1$-$C_{20}$ aliphatic radical, a divalent $C_5$-$C_{18}$ alicyclic radical or a divalent $C_6$-$C_{12}$ aromatic or aromatic containing radical and preferably R is a $C_2$-$C_8$ straight chain alkyl radical. Typically, R' is hydrogen or a $C_1$-$C_{20}$ aliphatic radical, $C_5$-$C_7$ alicyclic or $C_6$-$C_{12}$ aromatic or aromatic containing radical. Preferably, R' is hydrogen or a $C_1$-$C_4$ alkyl radical. Representative diamines include tetramethylene diamine, hexamethylene diamine, p-diaminocyclohexylmethane, 4,4-diaminodicyclohexyl ether, 4,4'-diaminodicyclohexyl sulfide, 4,4'-diaminodicyclohexyl sulfone, octamethylene diamine, decamethylene diamine, dodecamethylene diamine, meta-xylene diamine, 1,4-dimethyleneamino-1-phenyl-1,2,3,4-tetrahydrophthalene and the like. Hexamethylene diamine is an especially preferred diamine.

The dinitriles used herein are of the formula $$NC-R-CN \quad (II)$$

where R is as previously defined. Representative dinitriles include glutaronitrile, succinonitrile, adiponitrile, suberonitrile, isophthalonitrile, sebaconitrile, 1,10-decane dinitrile, methyl glutaronitrile, $\alpha$-methylene glutaronitrile, 1,4-dicyano-1-phenyl-1,2,3,4-tetrahydronaphthalene and the like. Adiponitrile is an especially preferred nitrile.

The instant invention is substantially aimed at the production of polyamides from diamines and dinitriles. However, other polyamides can also be prepared by the instant process by the polymerization of a major proportion of diamines and dinitriles with minor proportions of other polyamide forming compounds. Representatives of other polyamide forming compounds are (1) lactams, such as caprolactam, valerolactam, undecalactam, (2) amino carboxylic acids; (3) aliphatic and aromatic dicarboxylic acids, such as adipic acid, succinic acid, sebacic acid, isophthalic acid and terephthalic acid; and (4) aliphatic and aromatic diamides, such as malonamide, glutaramide, succinamide, adipamide, terephthalamide and isophthalamide.

The Catalyst

Any compound which will catalyze the polymerization reaction of dinitriles, diamines and water to form a polyamide is suitable as a catalyst in the instant invention. Without catalyst, the hydrolysis reaction speed is far too low and leads to a degraded product. Representatives of such catalysts are oxygen-containing phosphorus compounds, oxygen-containing boron compounds, oxygen-containing sulfur compounds, and a two-component catalyst system comprising copper or a copper-containing compound in conjunction with an oxygen-containing phosphorus compound or an oxygen-containing sulfur compound. These compounds may be employed alone or in combination with one another.

The oxygen-containing phosphorus compounds suitable as catalysts for use in the invention include phosphorous acid; phosphonic acid; alkyl and aryl substituted phosphonic acid; hypophosphorous acid; alkyl, aryl and alkyl/aryl substituted phosphinic acid; and phosphoric acid; as well as the alkyl, aryl and alkyl/aryl esters, metal salts, ammonium salts, and ammonium alkyl salts of these various phosphorus containing acids. As used herein, "alkyl/aryl" refers to those combinations where there is more than one organic substituent. In the substituted acids, the alkyl or aryl group replaced the hydrogen connected directly to the phosphorus atom. The esters are formed conveniently with the alkyl or aryl group replacing the hydrogen of an —OH group comprising the acid. To clarify the nomemclature, the names of the acids are identified with the structural formulas as follows:

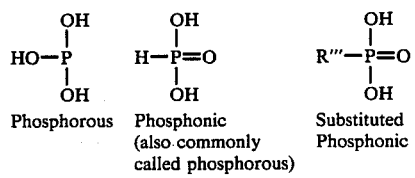

| OH | OH | OH |
| HO—P | H—P=O | R'''—P=O |
| OH | OH | OH |
| Phosphorous | Phosphonic (also commonly called phosphorous) | Substituted Phosphonic |

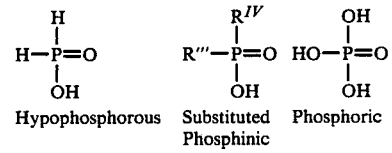

| H | $R^{IV}$ | OH |
| H—P=O | R'''—P=O | HO—P=O |
| OH | OH | OH |
| Hypophosphorous | Substituted Phosphinic | Phosphoric | where R''' is an alkyl or aryl or alkyl/aryl group and $R^{IV}$ is hydrogen or an alkyl or aryl group.

Preferred oxygen containing catalysts are phosphorous acid, phosphoric acid, and the sodium, lithium or sodium/lithium dibasic salts of phosphorous or phosphoric acids. These salts may be added initially or generated in situ by the addition of NaOH and/or LiOH to a reaction mixture already containing the oxyphosphorus acid or a monobasic salt thereof at a time late in the reaction cycle.

The oxygen-containing sulfur compounds suitable for use catalyst in the invention include sulfuric acid, sulfurous acid, sulfur dioxide, sulfur trioxide, alkyl and aryl substituted sulfonic acid, alkyl and aryl sulfinic acid and alkyl and aryl substituted sulfenic acid; as well as the alkyl, aryl and alkyl/aryl esters, metal salts, ammonium salts, and ammonium alkyl salts of these various sulfur containing compounds. The esters are formed conventionally with the alkyl or aryl group replacing the hydrogen of an —OH group comprising the acid. Sulfoxides, sulfones, sulfates, pyrosulfates, sulfites, pyrosulfites, sulfonates and sulfinates are included in the oxygenated sulfur compounds suitable for use as catalysts in the invention.

In order to clarify some of the compounds named above, the structures of several of the oxygenated sulfur compounds are:

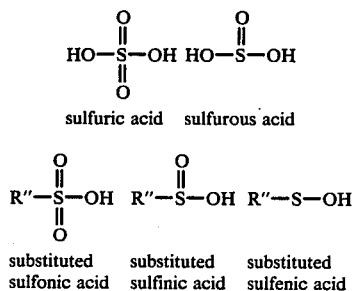

sulfuric acid   sulfurous acid substituted   substituted   substituted
sulfonic acid   sulfinic acid   sulfenic acid where each R'' is independently an alkyl or aryl radical.

Preferred oxygen-containing sulfur compounds are sulfuric acid, p-tolenesulfonic acid, and the sodium or lithium salts of sulfuric or p-toluenesulfonic acids. These salts may be added initially or generated in situ by the addition of naOH or LiOH to a reaction mixture already containing the oxygenated sulfur compound at a time late in the reaction cycle.

Oxygen-containing boron compounds which may be used as catalysts in the invention include boric acid, boric anhydride, salts of boric acid or boron anhydride, and esters of boric acid. Representatives of the oxygenated boron compounds are boric acid, sodium tetraborate ($Na_2B_4O_7$) and trimethyl borate.

Any copper compound may also be used as a catalyst in conjunction with at least one oxygen-containing compound of phosphorus or sulfur. The copper may be in any oxidation state without affecting the reaction rate. Best results are obtained if the copper compound is soluble in the reaction mixture, as better contact between the reactants and the catalytic site can then occur. Representatives of the copper compounds suitable for use as catalysts in this invention are copper halides, such as $CuCl_2$, CuI and CuBr, copper phosphates, copper sulfates, copper borates, copper carbonates, copper nitrate, copper (II) acetylacetonate and copper (III) acetylacetonate.

Sufficient catalyst is employed to promote the polymerization of the diamine and dinitrile with a typical amount of between 0.001 and 1 weight percent, based upon the total weight of the diamine, dinitrile and water. Catalyst levels of about 0.01 to about 1 weight percent are preferred.

The Polyamide

The polyamides produced by this invention are solid high molecular weight products having a nylon structure, i.e. the polyamide contains a plurality of amide linkages (—COHN—) as an integral part of the polymer backbone, as opposed to polyacrylamides which have an essentially all carbon backbone. These polyamides can be used in any application calling for the use of a nylon-type polymer. For example, these polyamides can be used as fibers, plastics, films and molding compounds.

The polyamides produced by the instant invention contain low levels of bis(hexamethylene)triamine impurities (i.e. levels equal to or less than 500 parts per million) and as such are suitable for commercial fiber-forming applications.

This invention is particularly well adapted to manufacturing high quality nylon-6,6 polymer from adiponitrile, hexamethylenediamine, catalyst and water. However, this invention is also useful for the manufacture of nylon-4,4; nylon-4,6 (from the appropriate dinitriles and diamines).

SPECIFIC EMBODIMENTS

In order to better illustrate the instant invention the following examples are provided. Unless noted to the contrary, all parts percentages are by weight.

EXAMPLES 1-12

The two-step process of the instant invention was practiced in a Parr autoclave (450 ml) equipped with an anchor agitator.

Hydrolysis Step

The reactor was charged with adiponitrile (64.88 g, 0.6 moles), water (40.2 g), hexamethylenediamine (0 to 10 percent by weight of total hexamethylenediamine) and catalyst (0.146 mole percent based on total adiponitrile and hexamethylene diamine employed in the two-step process). The reactor was then purged with nitrogen, sealed and connected to a back pressure regulator set at 750 psia. The reaction mixture was then heated with stirring. The catalyst, the amount of hexamethylenediamine, the temperature and the duration of the hydrolysis step are shown in the Table I.

Polymerization Step

After sufficient time had been allowed for substantial hydrolysis of the dinitrile, the remainder of the hexamethylene diamine (total amount added in hydrolysis and polymerization step equals 69.78 g, 0.6 moles) was added to the reactor by the use of a pump. Where indicated in Table I, sodium hydroxide (0.292 mole percent) and acetic acid (19.6 m. moles/Kg nylon) are added with the diamine. The reaction mixture was then heated to temperature sufficient to cause polymerization. After a time sufficient for polymerization, the reaction vessel was then reduced to atmospheric pressure over 30 minutes followed by a nitrogen sweep for 15 minutes while maintaining the polymerization temperature. The reactor was then cooled to room temperature under positive nitrogen pressure.

Recovery and Analysis of the Polymer

Nylon-6,6 polymer was recovered from the reactor and ground to a size such that it would pass through a ten mesh (U.S. Standard) screen. Melting point and onset decomposition temperature (ODT) was measured by differential scanning calorimetry (DSC). Weight loss was measured by thermal gravimetric analysis (TGA). Intrinsic viscosity (Dl/g) was determined in formic acid (90 weight percent) at 250° C. The bis(hexamethylene)-triamine level in the polymer was determined using HCl hydrolysis/extraction/GC analysis technique.

spheric pressure followed by blanketing the polymer product in the reactor with nitrogen.

The product was then recovered and analyzed as described in Examples 1–12. The results of several 94 Kg batches are shown in Table II.

TABLE II

PILOT PLANT SCALE BATCHES UTILIZING TWO-STEP PROCESS FOR THE PREPARATION OF NYLON-6,6 FROM ADIPONITRILE, HEXAMETHYLENE DIAMINE AND WATER

| Example No. | Catalyst | Polymer Intrinsic Viscosity | Characteristics Triamine Level |
|---|---|---|---|
| 13 | $H_3PO_3$ | 1.10 | 530 |
| 14 | $H_3PO_3$ | 1.01 | 200 |
| 15 | $H_3PO_3$ | 1.03 | 260 |

TABLE I

TWO-STEP PROCESS FOR THE PREPARATION OF NYLON-6,6 FROM ADIPONITRILE, HEXAMETHYLENE DIAMINE AND WATER

| Example Number | Catalyst | HMDA Added to 1st Step | Reaction Conditions 1st Step | Reaction Conditions 2nd Step | Polymer Characteristics Intrinsic Viscosity | Triamine Level PPM | Color |
|---|---|---|---|---|---|---|---|
| 1** | $H_3PO_3$ | None | 240° C. 70 min. | 260° C. 80 min. | 1.04 | 1060 | white |
| 2** | $H_3PO_3$ | None | 240° C. 70 min. | 260° C. 65 min. | 1.02 | 1010 | white |
| 3* | $Na_2HPO_3$ | 10 wt % | 240° C. 75 min. | 260° C. 90 min. | 1.04 | 1150 | white |
| 4 | $Na_2HPO_3$ | 10 wt % | 240° C. 75 min. | 260° C. 90 min. | 0.69 | 930 | white |
| 5 | $Na_2HPO_3$ | 10 wt % | 240° C. 75 min. | 260° C. 90 min. | 1.20 | 1160 | white |
| 6* | $Na_2HPO_3$ | 2.5 wt % | 240° C. 45 min. | 260° C. 100 min. | 1.43 | 560 | white |
| 7** | $H_3PO_3$ | 2.5 wt % | 240° C. 65 min. | 260° C. 70 min. | 0.64 | 940 | white |
| 8** | $H_3PO_3$ | 2.5 wt % | 240° C. 80 min. | 260° C. 55 min. | 0.65 | 1030 | white |
| 9** | $H_3PO_3$ | 5.0 wt % | 240° C. 100 min. | 260° C. 55 min. | 0.71 | 900 | white |
| 10* | $H_3PO_3$ | 2.5 wt % | 240° C. 75 min. | 260° C. 90 min. | 1.56 | 980 | white |
| 11* | $Na_3PO_4$ | 2.5 wt % | 250° C. 65 min. | 260° C. 75 min. | 0.99 | 1300 | white |
| 12** | $H_3PO_3$ | 10 wt % | 240° C. 90 min. | 260° C. 50 min. | 0.78 | 800 | white |

Notes
*NaOH (0.292 mole %) added in the second step. (No acetic acid added)
**NaOH (0.292 mole %) and HOAC (19.6 mmole/Kg of Nylon) added in the second step.

EXAMPLES 13–15

Procedures similar used in Examples 1–12 were employed in a pilot plant scale (94 Kg) batch reactor. Initially the reactor was blanketed with nitrogen up to a pressure of 29 psi. Adiponitrile (45 Kg), hexamethylenediamine (4.91 Kg) equivalent to 10 wt percent of total hexamethylenediamine, water (20–27 Kg) and phosphorous acid catalyst (13 mmole/Kg) were feed into the reactor and the agitator started. The temperature was increased to 235° C. and the pressure was allowed to rise up to 348 psig.

After approximately 2 hours at a reactor temperature of 235° C., hexamethylenediamine (43.62 Kg), acetic acid (110 g) and an antifoam agent (4–6 g) were added to the reactor over a 90 minute time span. After the addition of the hexamethylenediamine and temperature was gradually increased to 275° C. and maintained at 275° C. for approximately 2½ hours to allow for substantial polymerization of the monomers. The reactor pressure was then decreased from 348 psig to near atmo-

EXAMPLES 16, C-17 AND C-18

The instant process was compared to the gradual addition process disclosed in U.S. Pat. No. 4,520,190.

Example 16, utilizes the two-step process of the instant invention as described in Examples 1–12 where no hexamethylenediamine is added in the first step. Example C-17 employed the same reactant concentrations as Example 16 but utilized the gradual addition technique (i.e. hexamethylenediamine is added slowly over the course of the reaction, once the reaction temperature is achieved) as well as the temperature/time profile found in Example 1 of U.S. Pat. No. 4,520,190. Example C-18 utilizes the reactant concentrations of Example 16 and the gradual addition technique of U.S. Pat. No. 4,520,190 but maintains the reaction temperature profile employed in Example 16. The results of these examples are shown in Table III.

Table III shows that the two-step process of the instant invention which allows for substantial hydrolysis of the dinitrile before substantial addition of the diamine produces a polyamide with a lower level of bis(hexamethylene)triamine (BHMT) than processes which utilize the gradual addition of the diamine.

TABLE III
COMPARISON OF TWO-STEP PROCESS WITH GRADUAL ADDITION PROCESS OF U.S. Pat. No. 4,520,190

| Example No. | Process Description | Reaction Conditions | BHMT Level |
|---|---|---|---|
| 16 | Two-Step | 1. 70 min at 240° C. 2. over 35 min cool to 200° C., add HMDA, over 10 min heat to 260° C.; 3. 65 min at 260° C. | 1100 |
| C-17 | Gradual Addition Method of U.S. Pat. No. 4,520,190 | 1. at 250° C., over 4 hrs and 15 min, add HMDA 2. 15 min at 250° C. | 1420 |
| C-18 | Gradual Addition Method Utilizing Two-Step Temperature Profile | 1. for 105 min at 240° C., add HMDA 2. for 75 min at 260° C., complete addition of HMDA 3. 15 min at 260° C. | 1610 |

Notes:
1. BHMT = bis(hexamethylene)triamine
2. HMDA = hexamethylenediamine
3. All catalysts were H₃PO₃ at 0.146 mole percent.
4. Water concentration was 31.8 wt percent
5. Acetic acid (19.6 mmole/Kg nylon) was used as a chain terminator
6. In Example 16, no HMDA is used during the first 70 min at 240° C.; and NaOH is used in the second step to neutralize the H₃PO₃ catalyst.

The claimed invention is:

1. In the process for the manufacture of a polyamide comprising contacting an α,ω-dinitrile, an α,ω-diamine, water and a catalyst, the improvement comprising:
   (1) a hydrolysis step comprising reacting at an elevated temperature the α,ω-dinitrile and water in contact with the catalyst, to cause substantial hydrolysis of the α,ω-dinitrile prior to substantial addition of the α,ω-diamine, and
   (2) a subsequent polymerization step comprising adding the α,ω-diamine to the reaction product of the hydrolysis step, at a temperature sufficient to cause polymerization.

2. The process of claim 1, wherein the elevated temperature of the hydrolysis step is between about 200° C. and about 250° C. and wherein the temperature sufficient to cause polymerization in the polymerization step is between about 250° and about 300° C.

3. The process of claim 2, wherein the elevated temperature of the hydrolysis step is between about 225° and about 245° C. and wherein the temperature sufficient to cause polymerization in the polymerization step is between about 255° C. and 275° C.

4. The process of claim 1, wherein hydrolysis of the α,ω-dinitrile is greater than 80 percent by weight.

5. The process of claim 4, wherein the hydrolysis of the α,ω-dinitrile is greater than 90 percent by weight.

6. The process of claim 1, wherein approximately 10 weight percent or less of the total α,ω-diamine reacted is present in the hydrolysis step.

7. The process of claim 6, wherein no α,ω-diamine is present in the hydrolysis step.

8. The process of claim 1, wherein the catalyst is selected from the group consisting of (1) oxygen-containing phosphorus compounds, (2) oxygen-containing boron compounds, (3) oxygen-containing sulfur compounds, and (4) copper or copper-containing compounds in conjunction with an oxygen-containing phosphorus compound or an oxygen-containing sulfur compound.

9. The process of claim 1, wherein the catalyst comprises an oxygen-containing compound of phosphorus selected from the group consisting of phosphorous acid; phosphonic acid; alkyl or aryl substituted phosphonic acid, hypophosphorous acid; alkyl, aryl or alkyl/aryl substituted phosphinic acid, phosphoric acid, alkyl, aryl and alkyl/aryl esters of phosphorous acid, phosphonic acid, hypophosphorous acid or phosphoric acid; and metal salts, ammonium salts and ammonium alkyl salts of phosphorous acid, phosphonic acid, hypophosphorous acid or phosphoric acid.

10. The process of claim 9, wherein the catalyst comprises an oxygen-containing compound of phosphorous acid, phosphoric acid, and the sodium, lithium or sodium/lithium dibasic salts of phosphorous acid or phosphoric acid.

11. The process of claim 1, wherein the catalyst comprises an oxygen-containing compound of sulfur selected from the group consisting of sulfuric acid; sulfurous acid; sulfur dioxide; sulfur trioxide; alkyl or aryl substituted sulfonic acid; alkyl or aryl substituted sulfinic acid; alkyl and aryl substituted sulfenic acid; alkyl, aryl and alkyl/aryl esters of sulfuric acid, sulfonic acid, sulfinic acid or sulfenic acid; and metal salts, ammonium salts or ammonium alkyl salts of sulfuric acid, sulfonic acid, sulfinic acid or sulfenic.

12. The process of claim 11, wherein the catalyst comprises an oxygen-containing compound of sulfur selected from the group consisting of sulfuric acid, p-toluenesulfonic acid, and the sodium or lithium salts of sulfuric acid or p-toluenesulfonic acid.

13. The process of claim 1, wherein the catalyst comprises an oxygen-containing compound of sulfur selected from the group consisting of sulfoxides, sulfones, sulfates, pyrosulfates, sulfites, pyrosulfites, sulfonates and sulfinates.

14. The process of claim 1 wherein the catalyst in an amount between about 0.001 and about 1.0 weight percent based on the total weight of dinitrile, diamine and water.

15. The process of claim 1, wherein the diamine is of the formula:

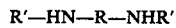

R'—HN—R—NHR' and wherein the dinitrile is of the formula:

NC—R—CN wherein each R is a divalent organic radical and each R' is independently hydrogen or a univalent organic radical.

16. The process of claim 15 wherein each R is independently $C_1$ to $C_{20}$ divalent aliphatic radical, a $C_5$ to $C_{18}$ divalent alicyclic radical or a $C_6$–$C_{12}$ divalent aromatic or aromatic containing radical and wherein each R' is dependently hydrogen, a $C_1$ to $C_{20}$ univalent aliphatic radical, a $C_5$ to $C_7$ alicyclic radical or a phenyl radical.

17. The process of claim 16, wherein each R is independently a $C_2$ to $C_8$ straight chain divalent alkyl radical and each R' is hydrogen or a $C_1$ to $C_4$ radical.

18. The process of claim 15, wherein the diamine is hexamethylenediamine and wherein the dinitrile is adiponitrile.

* * * * *